US006209954B1

United States Patent
Bombardier

(10) Patent No.: US 6,209,954 B1
(45) Date of Patent: Apr. 3, 2001

(54) BICYCLE SADDLE

(76) Inventor: James H. Bombardier, 780 SW. Menefee La., Portland, OR (US) 97201

( * ) Notice: Subject to any disclaimer, the term of this patent is extended or adjusted under 35 U.S.C. 154(b) by 0 days.

(21) Appl. No.: 09/393,135

(22) Filed: Sep. 10, 1999

Related U.S. Application Data

(60) Provisional application No. 60/140,318, filed on Jun. 21, 1999.

(51) Int. Cl.$^7$ .......................................................... B62J 1/00
(52) U.S. Cl. ............................................ 297/201; 297/214
(58) Field of Search ................................... 297/201, 214, 297/195.1

(56) References Cited

U.S. PATENT DOCUMENTS

| | | |
|---|---|---|
| D. 237,478 | 11/1975 | Carpenter et al. . |
| D. 384,828 | 10/1997 | Mel . |
| 872,124 * | 11/1907 | Hammaren ........................ 297/201 X |
| 2,476,226 | 7/1949 | Schwinn . |
| 3,604,748 | 9/1971 | Lamkemeyer . |
| 3,698,763 | 10/1972 | Worley . |
| 3,708,201 | 1/1973 | Lamkemeyer . |
| 3,756,653 | 9/1973 | Worley . |
| 3,815,953 | 6/1974 | Worley . |
| 3,884,525 | 5/1975 | Messinger . |
| 3,905,643 | 9/1975 | Lamkemeyer . |
| 4,098,537 | 7/1978 | Jacobs . |
| 4,182,508 | 1/1980 | Kallai et al. . |
| 4,387,925 | 6/1983 | Barker et al. . |
| 4,429,915 | 2/1984 | Flager . |
| 4,471,538 | 9/1984 | Pomeranz et al. . |
| 4,504,089 | 3/1985 | Calvert et al. . |
| 4,568,121 | 2/1986 | Kashima . |
| 4,572,575 | 2/1986 | Golden et al. . |
| 4,773,705 | 9/1988 | Terranova . |
| 4,807,856 | 2/1989 | Techenbrock . |
| 4,877,286 * | 10/1989 | Hobson et al. ....................... 297/201 |
| 4,978,167 | 12/1990 | Harvey . |
| 5,074,618 | 12/1991 | Ballard . |
| 5,123,698 | 6/1992 | Hodges . |
| 5,165,752 | 11/1992 | Terry . |
| 5,222,781 | 6/1993 | Mele . |

(List continued on next page.)

Primary Examiner—Anthony D. Barfield
(74) Attorney, Agent, or Firm—Marger Johnson & McCollom, P.C.

(57) ABSTRACT

The bicycle saddle of the present invention is designed to adequately support the ischial tuberosities, ischiopubic rami, and nearby regions of bicycle riders without the center of the standard saddle or the front horn. The bicycle saddle allows the rider to personalize the position of two independently adjustable riding portions, each riding portion comprising a plurality of surfaces or contours. Each riding portion is pivotally connected at the front end to either outer or inner pivot positions or slots on a saddle frame having innermost and outermost mounting positions. The outer or inner pivot positions or the outermost or innermost slot positions on the saddle frame generally represent positions for male and female riders, respectively. Each riding portion is angularly adjustable in the horizontal plane at the back end to conform to variations in male and female ischiopubic rami. Thus, the rider's pelvic bones ride atop the riding portions while the soft tissue of the groin area is untouched between each riding portion thereby avoiding pressure on soft tissue, arteries, veins, and nerves. The contours and plurality of surfaces of each riding portion is designed to allow easy pedaling while providing a comfortable support surface for the ischiopubic rami, Ischial Tuberosities, and associated muscle mass. The saddle frame provides common saddle mounting capabilities.

14 Claims, 8 Drawing Sheets

U.S. PATENT DOCUMENTS

| | | |
|---|---|---|
| 5,226,624 | 7/1993 | Kingsbery . |
| 5,244,301 | 9/1993 | Kurke et al. . |
| 5,344,170 | 9/1994 | Ochoa . |
| 5,352,016 | 10/1994 | Hobson . |
| 5,362,126 | 11/1994 | Bontrager . |
| 5,362,127 | 11/1994 | Chang . |
| 5,441,327 | 8/1995 | Sanderson . |
| 5,513,895 | 5/1996 | Olson et al. . |
| 5,558,396 | 9/1996 | Yu . |
| 5,571,273 | 11/1996 | Saarinen . |
| 5,597,202 | 1/1997 | Anderson . |
| 5,636,896 | 6/1997 | Howard . |
| 5,676,420 | 10/1997 | Kuipers et al. . |
| 5,709,430 | 1/1998 | Peters . |
| 5,720,518 * | 2/1998 | Harrison .......................... 297/214 X |
| 5,725,274 | 3/1998 | Bergmeister . |
| 5,823,618 * | 10/1998 | Fox et al. ............................ 297/201 |

* cited by examiner

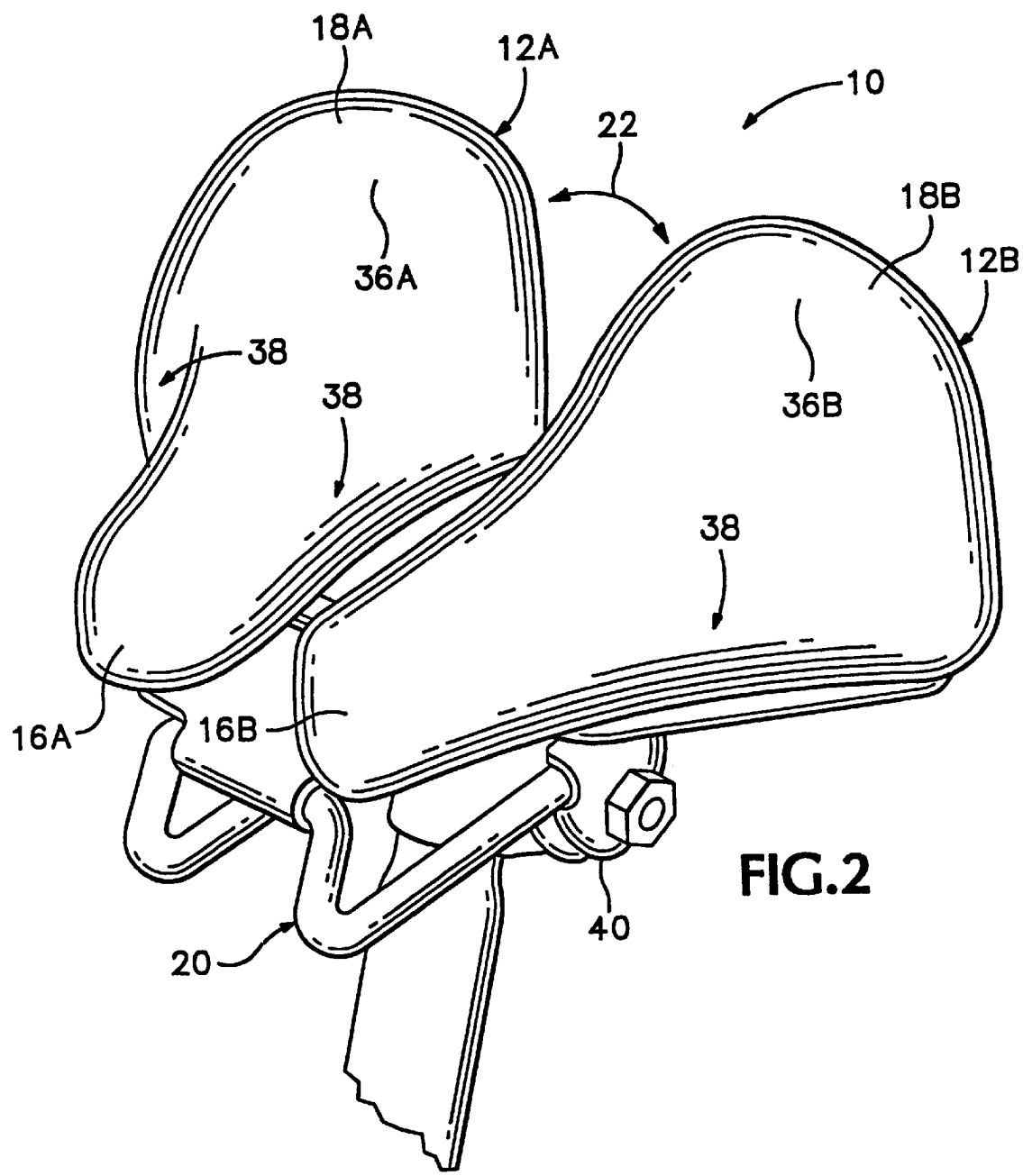

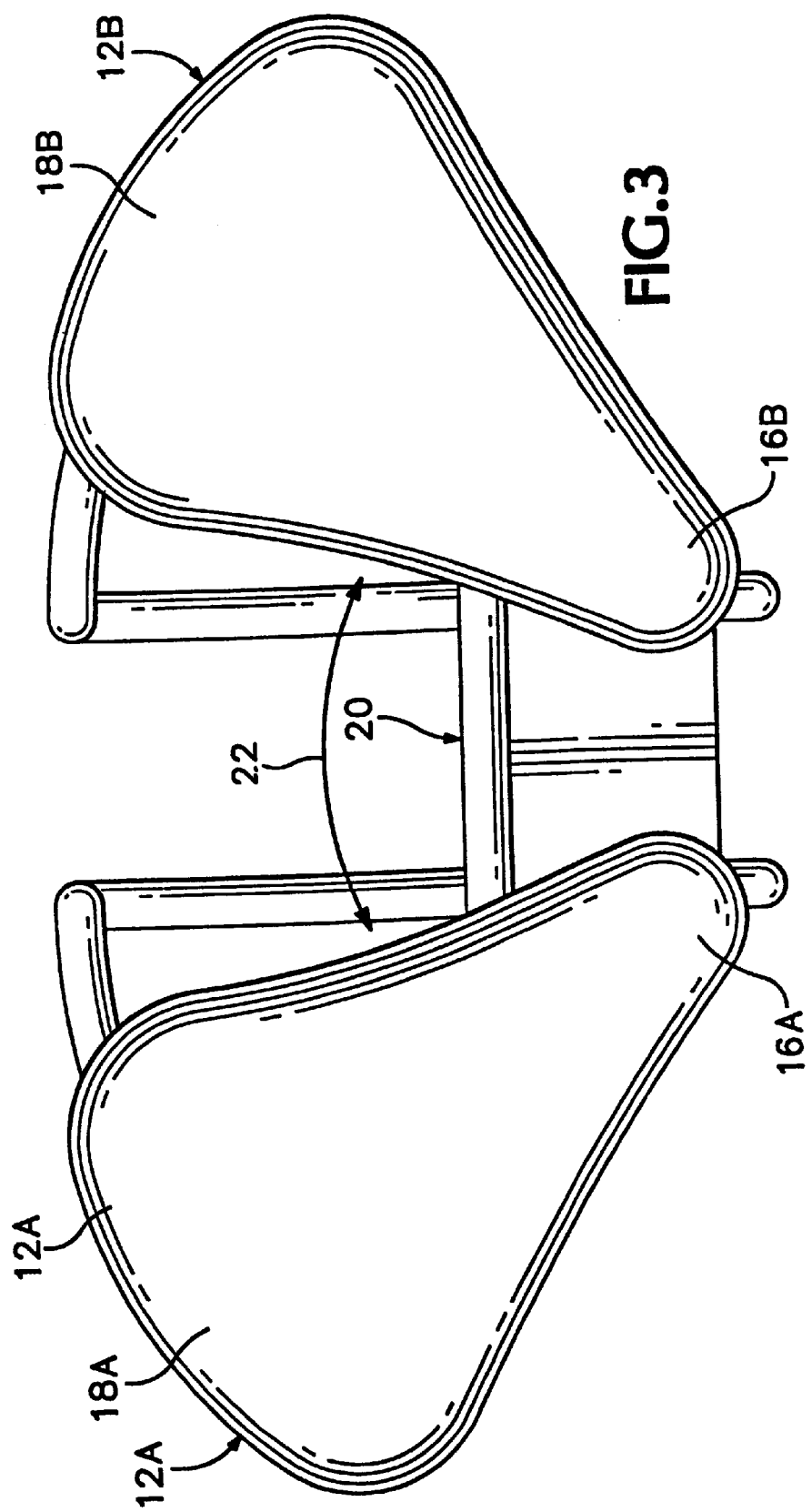

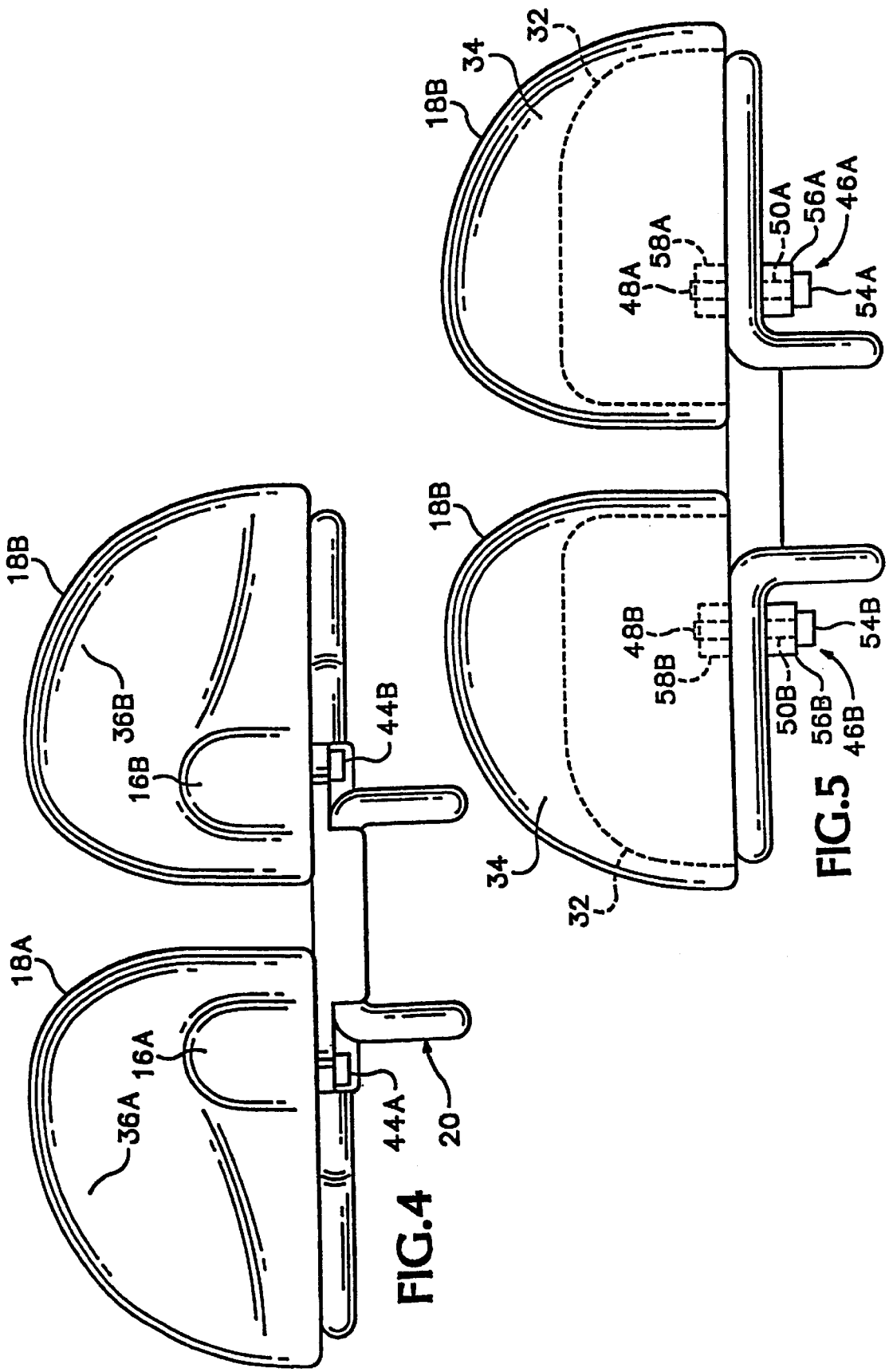

BICYCLE SADDLE

This application claims priority of U.S. Provisional Application Ser. No. 60/140,318, filed on Jun. 21, 1999, entitled BICYCLE SADDLE and is incorporated herein by reference.

BACKGROUND OF THE INVENTION

1. Field of the Invention

The invention relates to a bicycle saddle and, more particularly, to an adjustable bicycle saddle that uniquely supports the ischial tuberosities, ischiopubic rami, and nearby regions of bicycle riders.

2. Description of the Prior Art

Most of the variations in bicycle saddle design center around a fixed, single platform concept. Conventional single platform bicycle saddles include a forward protruding horn. Conventional single platform saddles exert pressure on soft tissue, arteries, veins, and associated nerves often resulting in numbness, pain, and/or erectile dysfunction in bicycle riders. The conventional single platform saddle design is prevalent on bikes all over the world.

While there continues to be much improvement in the structure and efficiency of other components of the bicycle, saddle design is only recently experiencing some long needed exploration. Improved single platform saddles, like those manufactured by Specialized®, Terry®, and others, claim to eliminate pressure on sensitive soft tissues of the groin area. However, they still have riding portions of their saddles that put pressure on sensitive groin areas and do not provide specific support for the ischial tuberosities, ischiopubic rami, and nearby regions of bicycle riders. Additionally, conventional and improved single platform saddles do not adjust to known variations in the ischiopubic rami of men and women.

Accordingly, a need remains for a bicycle saddle that adequately supports the ischial tuberosities, ischiopubic rami, and nearby regions of bicycle riders resulting in a comfortable ride that avoids soft tissue abrasion, numbness, pain, and/or erectile dysfunction while allowing ease of pedaling. A need also remains for a bicycle saddle that adjusts to variations in the ischiopubic rami of men and women.

SUMMARY OF THE INVENTION

The bicycle saddle of the present invention is designed to adequately support the ischial tuberosities, ischiopubic rami, and nearby regions of bicycle riders. The bicycle saddle allows the rider to personalize the position of two independently adjustable riding portions, each portion comprising a plurality of surfaces and contours. Each riding portion is pivotally connected at the front end of the saddle frame to a slot, which allows for various width adjustments. A wider or narrower width adjustment corresponds, generally, to riding positions for male and female riders, respectively.

Each riding portion is angularly adjustable at the back end to conform to angular variations in male and female ischiopubic rami. Thus, the rider's pelvic bones ride atop the riding portions while the soft tissue of the perineum area is untouched between each riding portion. The resulting saddle configuration prevents riding problems like soft tissue abrasions, numbness, pain, and/or erectile dysfunction for men by eliminating pressure and/or compression Dorsal artery, vein and nerves. It can also eliminate pressure on women's Mons pubis, clitoris, and urethra.

BRIEF DESCRIPTION OF THE DRAWINGS

The foregoing and other objects, features, and advantages of the invention will become more readily apparent from the following detailed description of a preferred embodiment that proceeds with reference to the following drawings.

FIG. 2 is a perspective view of the bicycle saddle shown in FIG. 1;

FIG. 3 is a top view of the bicycle saddle shown in FIG. 1;

FIG. 4 is a front view of the bicycle saddle shown in FIG. 1;

FIG. 5 is a back view of the bicycle saddle shown in FIG. 1;

DETAILED DESCRIPTION OF THE PREFERRED EMBODIMENT

Figure 1:
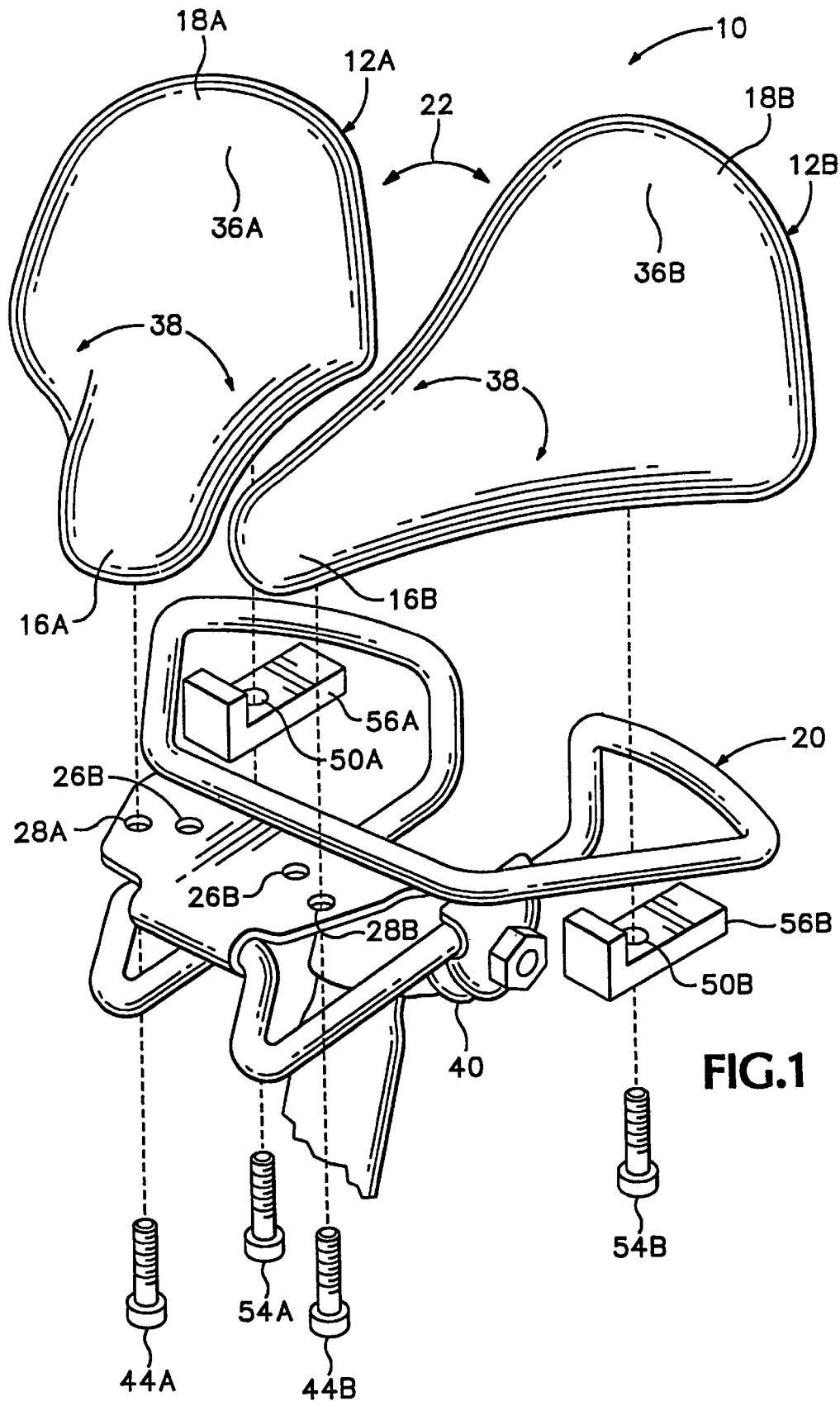
FIG. 1 is an exploded view of a first embodiment of the bicycle saddle of the present invention.
Figure 6:
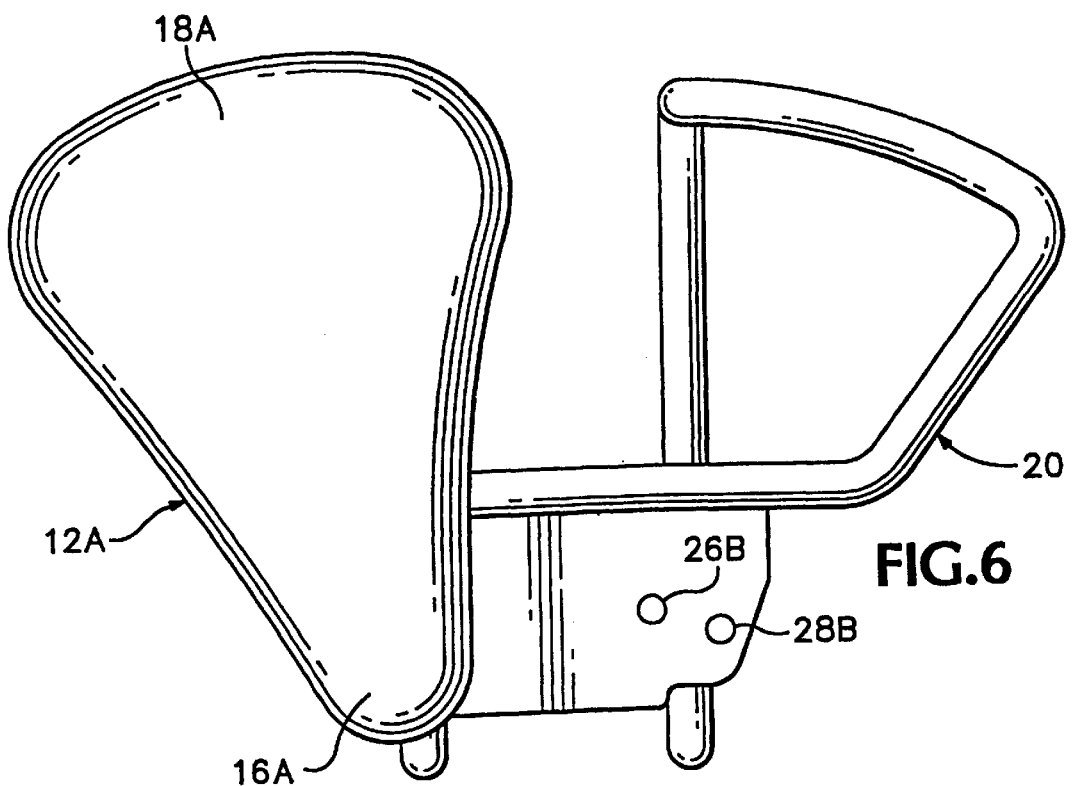
FIG. 6 is a top view of the bicycle saddle shown in FIG. 1 with one saddle portion removed to show the underlying frame.
Figure 7:
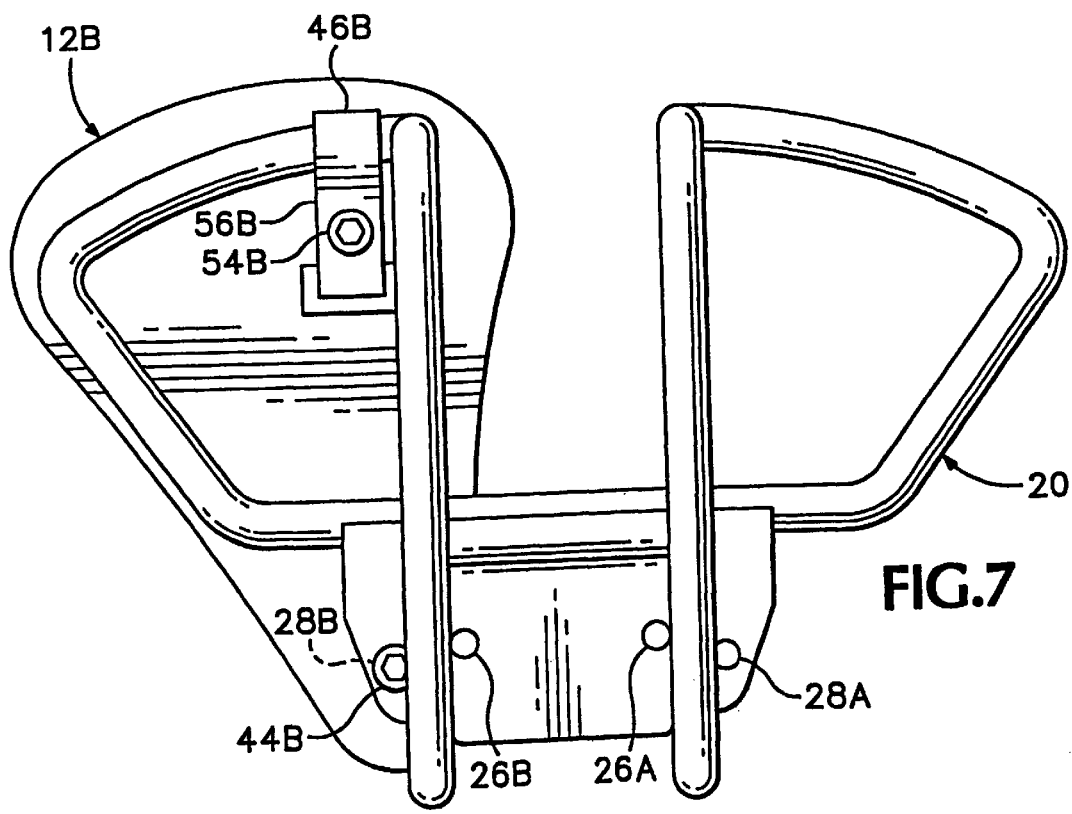
FIG. 7 is a bottom view of the frame of the bicycle saddle shown in FIG. 1.
Figure 8:
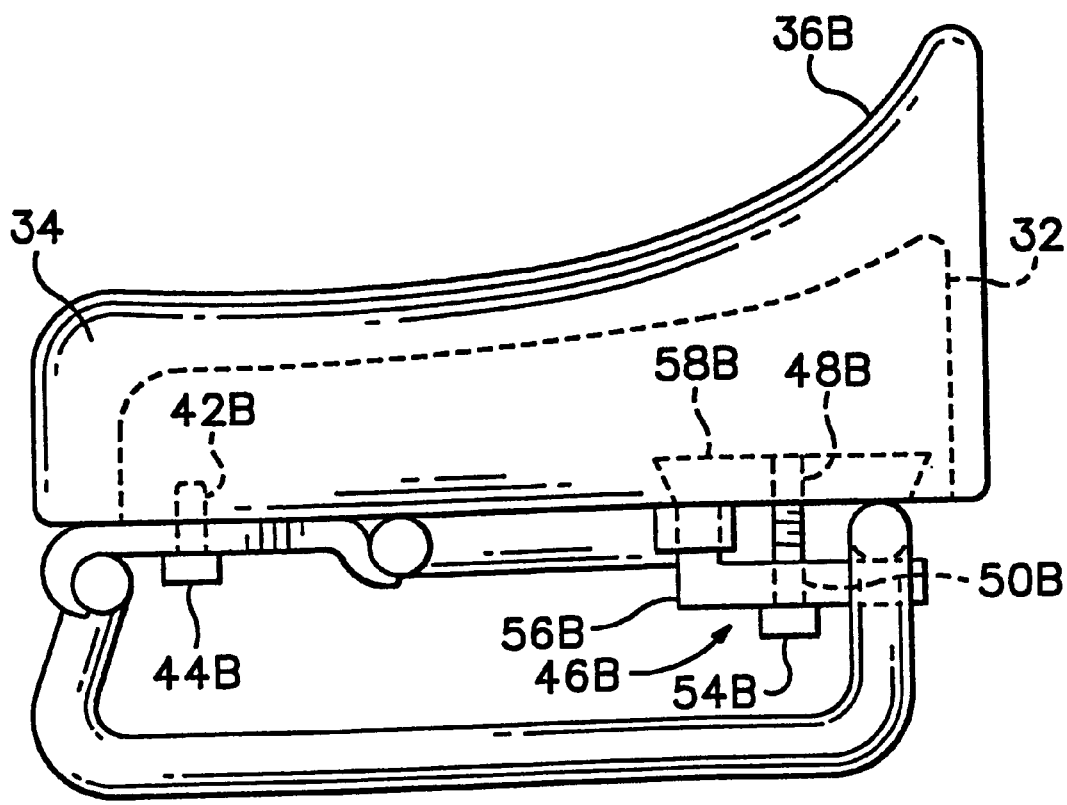
FIG. 8 is a side view of the bicycle saddle shown in FIG. 1.
Figure 9:
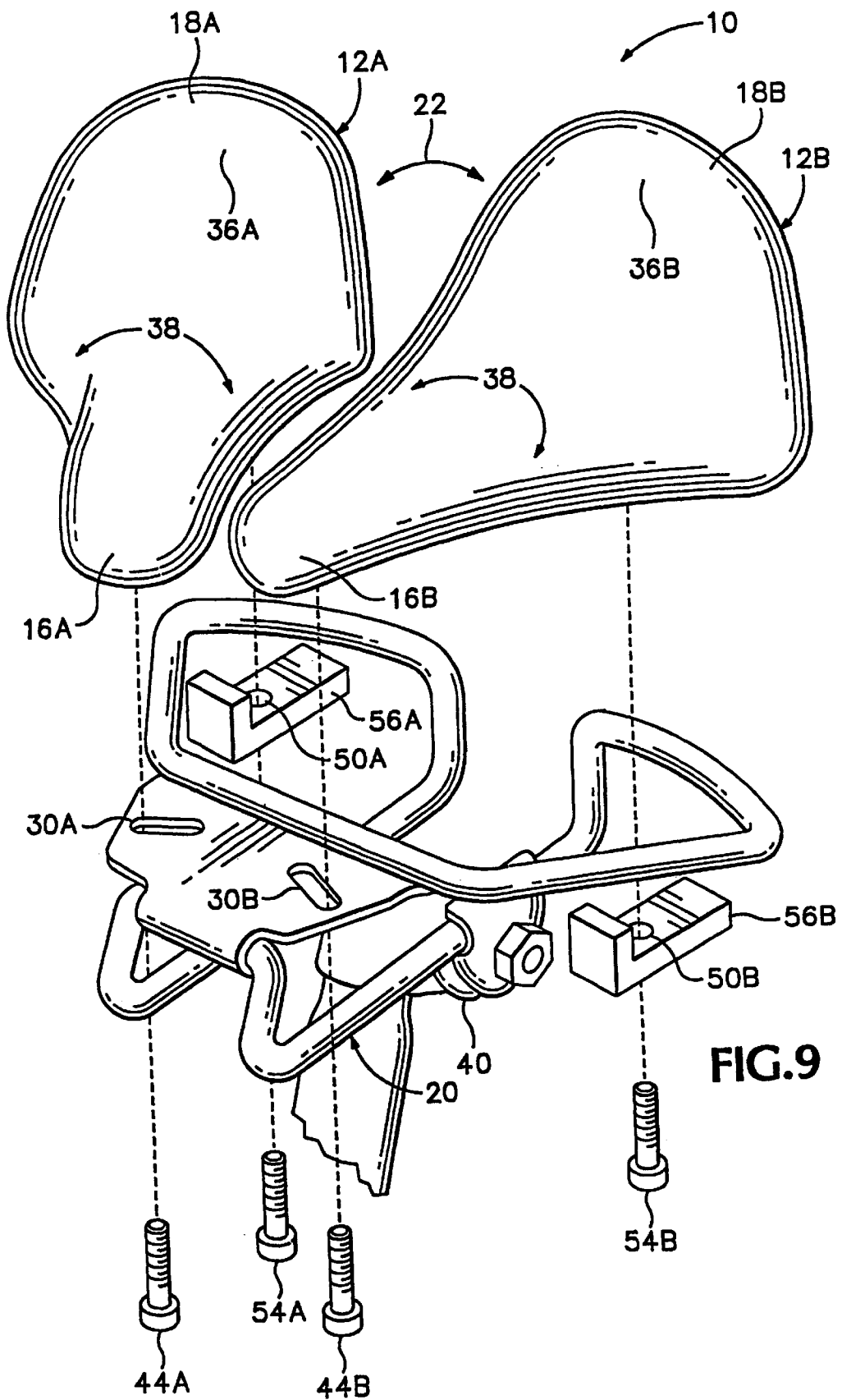
FIG. 9 is an exploded view of a second embodiment of the bicycle saddle of the present invention.
Figure 10:
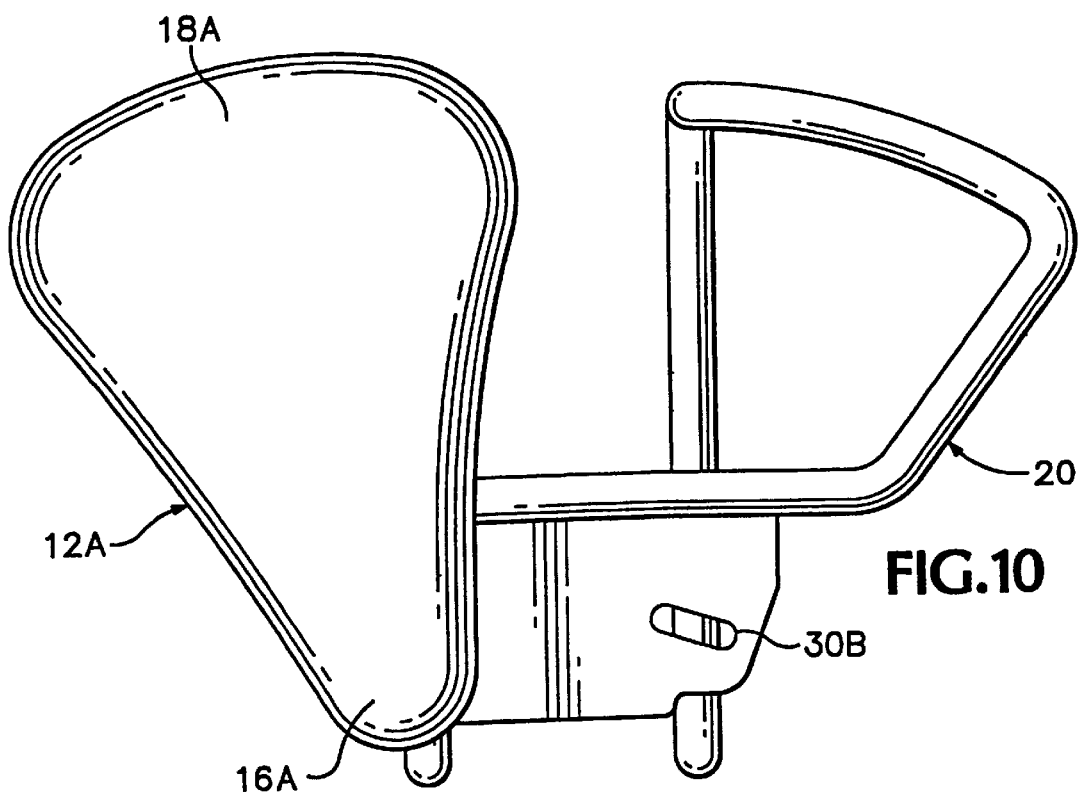
FIG. 10 is a top view of the bicycle saddle shown in FIG. 9 with one saddle portion removed to show the underlying frame.
Figure 11:
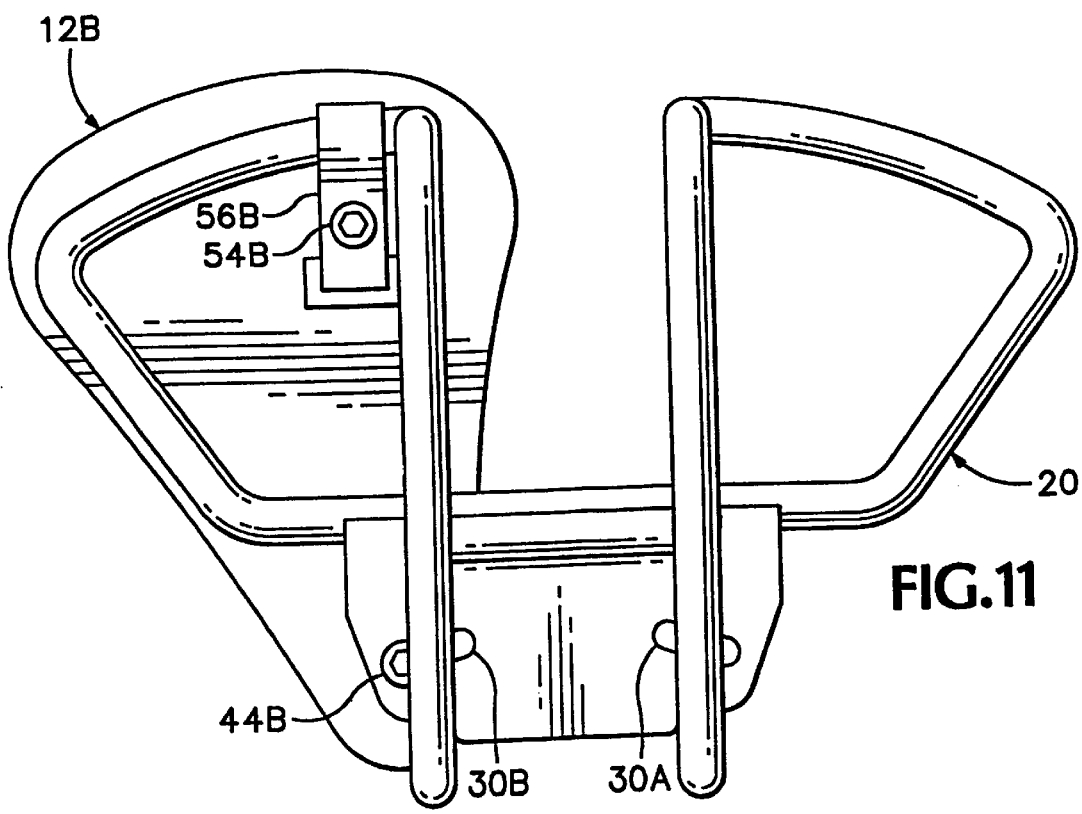
FIG. 11 is a bottom view of the frame of the bicycle saddle shown in FIG. 9.

Referring to FIGS. 1–11, the saddle 10 of the present invention consists of two separate riding portions 12A and 12B mounted on a support frame 20. Riding portion 12A has a front end 16A and a back end 18A. Likewise, riding portion 12B has a front end 16B and a back end 18B. In the embodiment shown in FIG. 1, the front ends 16A and 16B are pivotally mounted to the frame 20 at inner pivot positions 26A and 26B, respectively, or at outer pivot positions 28A and 28B, respectively. Alternatively, in the embodiment shown in FIG. 9, the front ends 16A and 16B are pivotally mounted to slots 30A and 30B, respectively. The back ends 18A and 18B are adjustably mounted to the frame 20 such that the riding portions 12A and 12B can be swung individually in arcs along a horizontal plane and then locked into the desirable riding position using corresponding clamps 46A and 46B (FIGS. 5 and 8).

By so mounting the riding portions 12A and 12B, an angle 22 is created along a horizontal plane between the riding portions 12A and 12B. The angle 22 accommodates the variations in ischiopubic rami of male and female bicycle riders. The ischiopubic rami are the bones on the human pelvis, on which the body rests when sitting. The angle of the female ischiopubic rami varies between about 80 and 85 degrees while the angle of male ischiopubic rami varies between about 50 and 60 degrees. If the riding portions are positioned in the front at the innermost slot positions they touch to form continuous support for the ischiopubic rami, the pubic symphysis (where the ischiopubic rami join), and the Ischial Tuberosities. If the riding portions are positioned at the outermost slot location they provide for about a ¾" gap between the portions. Some gap between the portions is recommended for men to allow for the uninhibited passage of the Dorsal artery, vein, and nerves. Some gap between the riding portions may be desirable for women due to the sensitivity of the Mons pubic, clitoris, and urethra. In the saddle 10 shown in FIG. 1, the inner pivot positions 26A and 26B correspond to the female ischiopubic rami and the outer pivot positions 28A and 28B correspond to the male ischiopubic rami. In the saddle 10 shown in FIG. 1, the front end 16A touches the front end 16B in the inner (female) pivot position 26A and 26B and is about ¾ of an inch apart from the front end 16B in the outer (male) pivot position 28A and 28B. In the saddle 10 shown in FIG. 9, the front ends 16A and 16B adjust along the slots 30A and 30B, respectively.

Each riding portion 12A and 12B consists of a first shape-forming layer 32 that is covered with a second cushioning layer 34 as best shown in FIGS. 5 and 8. Each of the first and second layers 32 and 34 is formed of a material that has a preferred durometer and thickness. The first layer 32 is formed of a material that is preferably harder than the material forming the second layer 34. The softer second layer 34 prevents the rider's pelvic bones from sinking into and making contact with the first harder layer 32 thereby preventing undue pressure on arteries, veins, soft tissue, and nerves of the groin area.

The front ends 16A and 16B of the riding portions 12A and 12B, respectively, are entirely made of the softer second layer 34 to insure that riders transitioning from standing to sitting will not press through to the harder first layer 32. The riding portions 12A and 12B each have a left and a right curved sides 38 that provide optimal curvature for female and male pedaling movements. Additionally, each riding portion 12A and 12B extends from a narrow front end 16A and 16B, respectively, to a wider back end 18A and 18B, respectively, culminating in a raised ridge surface 36A and 36B, respectively.

The ridge surfaces 36A and 36B are perpendicular to the length of the corresponding riding portions 12A and 12B. The length of each riding portion 12A and 12B corresponds, generally, to the length of the ischiopubic rami and associated ischial tuberosities. Each riding portion 12A and 12B has a contoured top shape that approximates the ischiopubic rami and ischial tuberosities of many riders. The width of the ridge surfaces 36A and 36B provides support for muscle mass on either side of the ischial tuberosities.

The ridged surfaces 36A and 36B are preferably constructed of the softer second layer material 34 allowing riders to perch on the ridged surface as an alternative riding position. The thickness of the ridge surfaces 36A and 36B are also built to a specific depth of the softer second material 34 to insure that if a rider comes down hard on the ridge they will not press through to the harder first layer 32. In one embodiment, the first layer 32 is made of a polyurethane material having a first predetermined durometer, e.g., 67 durometer on the Shore D scale. The first layer 32 can also be made of other materials including injection molding plastic, metal, composite polymers, and the like. Similarly, the second layer 34 is made of a polyurethane material having a second predetermined durometer, e.g., 20 durometer on the Shore A scale. The second layer 34 can be made of other materials including foam substances, gel substances, and the like.

The support frame 20 for the riding portions 12A and 12B is designed to provide mounting capabilities 40 on standard seat posts. The frame 20 includes a front section having slots 30A and 30B or inner (female) pivot positions 26A and 26B and outer (male) pivot positions 28A and 28B for pivotally mounting each of the riding portions 12A and 12B to the frame 20. The frame 20 also provides support for the riding portions 12A and 12B within the range of desired horizontal adjustability. In the preferred embodiment, the frame 20 is made of an aluminum alloy, e.g., 2024 aluminum drawn wire, that is welded to a bracket (not shown) made of substantially the same material. The frame 20 and bracket are welded using a common resistance or arc welding process. The frame 20 and bracket are then subjected to a post-weld solution heat treatment followed by artificial aging to a certain condition, e.g., a T6 condition.

At the front ends 16A and 16B, the riding portions 12A and 12B mount to the frame 20 using fasteners 44A and 44B. The fasteners 44A and 44B traverse either the inner pivot positions 26A and 26B or the outer pivot positions 28A and 28B or the slots 30A and 30B in the frame 20. The fasteners 44A and 44B are then attached to the corresponding riding portions 12A and 12B by advancing them into threaded inserts 42A and 42B embedded in the bottom ends of the corresponding the riding portions. As mentioned above, the bottom end of each riding portion 12A and 12B comprises the first layer 32. A threaded insert 42A and 42B is positioned in the noses or front ends 16A and 16B of each corresponding riding portion 12A and 12B for preferred pivoting of the riding surfaces on the frame 20.

At the back ends 18A and 18B, the riding portions 12A and 12B mount to the frame 20 using clamps 46A and 46B as best shown in FIGS. 1, 5, 7–8, 9, and 11. The clamp 46A comprises a cleat portion 56A and a fastener 54A. Likewise, the clamp 46B comprises a cleat portion 56B and a fastener 54B. The riding portion 12A is attached to the back of frame 20 by positioning the frame 20 between the cleat portion 46A and a piece of aluminum plate (not shown) located in the bottom surface of the riding portion 12A between a standoff portion of the first layer 32 and the frame 20. The fastener 54A then traverses through the through a hole 50A and advances into a threaded insert 52A embedded in the aluminum plate encapsulated in the bottom surface of the back end 18A. The cleat portion 46A spans the distance between the standoff and the support frame and provides a mating force when the fastener 54A is tightened. The riding portion 12B is similarly attached to the back of frame 20. The cleat portions 46A and 46B are preferably made of aluminum or like material.

The saddle 10 is used as follows. The first step is to properly orient and set each riding portion 12A and 12B. Setting the riding portions 12A and 12B at the outermost slot positions 30A and 30B, respectively, in the front section of the frame 20 provides the maximum gap between the riding portions 12A and 12B. This gap is designed to maximally accommodate the male dorsal artery and vein that extend between the perineum and the male genitalia or the female Mons pubis, clitoris, and urethra. Commonly available single platform riding saddles compress male the Dorsal artery, vein, and nerves or female Mons pubis, clitoris, and urethra between the saddle and the pubic symphysis when the rider is in a riding position. Alternatively, the front of the riding portions 12A and 12B may be set to the innermost slot pivot positions 30A and 30B of the frame 20 closing the gap between the riding portions. This orientation of the front of the riding portions provides continuous support for the ischiopubic rami, pubic symphysis, and Ischial Tuberosities. Another alternative mentioned above is to mount the riding portions 12A and 12B to the inner pivot positions 26A and 26B (female) or the outer pivot positions 28A and 28B (male). Concurrent with the rider's positioning of the front of the riding portions is setting the swing of the back of each portion to accommodate the rider's unique angle of their ischiopubic rami and personal comfort (including compensating for pelvic asymmetry).

It is recommended that each rider personally or professionally "fit" themselves to their bicycle. A "fit" consists of insuring that:

a) proper leg extension exists between the saddle and the pedals;
b) the horizontal tilt of the saddle fits their riding style and integrates with the other "fit" factors;
c) the distance between the saddle and the handlebars is proper; and
d) the height of the handlebars in relation to the saddle provides for the proper angle to minimize shoulder and arm stress.

Riders should mount their bicycles on a bicycle trainer for initial saddle installation and adjustment. Riders should set the riding portions 12A and 12B to the suggested average angles for men or women and move one or both sides in increments of an eighth to a quarter inch. The riding portions 12A and 12B can be adjusted to move toward or away from each other depending on the rider's comfort and fit. The goal is to achieve the most comfortable placement of the riding portions 12A and 12B under the rider's ischiopubic rami. Riders should keep an open mind to positioning the riding portions 12A and 12B in relative asymmetry since pelvic asymmetries are common. Minor adjustments should be expected during subsequent riding sessions to maximize comfort.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A bicycle saddle, comprising:
   a frame having a first and a second front angled slots;
   a first riding portion having a front end and a back end, the front end of the first riding portion being adjustable pivotally mounted to the first front angled slot and the back end of the first riding portion being mounted to the frame and angularly adjustable in a first angular direction; and
   a second riding portion having a front end a back end, the front end of the second riding portion being adjustably pivotally mounted to the second front angled slot and the back end of the second riding portion being mounted to the frame and angularly adjustable in a second angular direction, the first and second angular directions adapted to accommodate angular variations in ischiopubic rami.

2. The bicycle saddle of claim 1 wherein an innermost slot position is adapted to provide continuous support for the ischiopubic rami, pubic symphysis, and Ischial Tuberosities and wherein an outermost slot position is adapted to provide uninhibited passage of a male Dorsal artery, vein, and nerves and female Mons pubis, clitoris, and urethra sensitivity.

3. The bicycle saddle of claim 1 wherein each riding portion comprises:
   a first layer made of a first material having a first hardness for forming a shape of the riding portion; and
   a second layer made of a second material having a second hardness overlaying the first material for providing support and additional shaping.

4. The bicycle saddle of claim 3 wherein the first and second material have different durometer specifications.

5. The bicycle saddle of claim 1 wherein each of the first and second riding portions include a ridged surface at the back end adapted to support muscle mass on either side of ischial tuberosities.

6. The bicycle saddle of claim 1 wherein each of the first and second riding portions includes curved outer sides for easy pedaling.

7. The bicycle saddle of claim 1 wherein the frame includes a mounting structure that fits standard seat posts.

8. A bicycle saddle, comprising:
   a frame having a frame front and back, the back having first and second arcuate members;
   a first riding portion having a first front end and a first back end, the first front end being adjustably pivotally mounted to the frame front and the first back end being angularly adjustably mounted to the first arcuate member;
   a second riding portion having a second front end and a second back end, the second front end being adjustably pivotally mounted to the frame front and the second back end being angularly adjustably mounted to the second arcuate member; and
   an angle between the first and second riding portions adapted to adjust to variations in ischiopubic rami of bicycle riders.

9. The bicycle saddle of claim 8 wherein each riding portion includes:
   a first layer made of a first material having a first hardness for forming a shape of the riding portion; and
   a second layer made of a second material having a second hardness overlaying the first layer for providing cushioning and additional shaping to the riding portion, the second material having a durometer specification different from a durometer specification of the first material.

10. The bicycle saddle of claim 8 wherein each of the first and second riding portions includes a ridged surface at a corresponding back end adapted to support muscle mass on either side of the ischial tuberosities.

11. The bicycle saddle of claim 8 wherein the first riding portion includes:
    a first threaded insert embedded into the first front end for receiving a first fastener, the first fastener securing the first front end to the first front mounting position on the frame; and
    a first clamp for securing the first back end to the the first arcuate member; and
    wherein the second riding portion includes:
    a second threaded insert embedded into the second front end for receiving a second fastener, the second fastener securing the second front end to the second front mounting position; and
    a second clamp for securing the second back end to the second arcuate member.

12. The bicycle saddle of claim 8 wherein the frame includes a first and a second angled slots and wherein the first front end is mounted to the first angled slot and the second front end is mounted to the second angled slot.

13. A bicycle saddle, comprising:
    a frame having a front and a back; and
    a first and a second riding portions, the first and second riding portions each having a front and a back end, the front end of the first and second riding portions being pivotally adjustably mounted to the frame front and the back end of the first and second riding portions being angularly adjustably mounted to the frame back, the front end of the first and second riding portions each being devoid of a pommel such that front end of the first and second riding portions is adapted to extend no longer than the pubic symphysis of a rider.

14. A bicycle saddle, comprising:

a frame having a front section including a first and a second angled slots and a back section having first and second arcuate members;

a first riding portion having a front end and a back end, the front end of the first riding portion being adjustably pivotally mounted to the frame and the back end of the first riding portion being mounted to the frame and angularly adjustable in a first angular direction; and a second riding portion having a front end a back end, the front end of the second riding portion being adjustably pivotally mounted to the frame and the back end of the second riding portion being mounted to the frame and angularly adjustable in a second angular direction, wherein the first and second angular directions are adapted to align to variations in ischiopubic rami;

wherein the first and second angled slots are adapted to adjustably pivotally mount the front ends of the first and second riding portions, respectively; and wherein the first and second arcuate members are adapted to allow for angular adjustability of the back ends of the first and second riding portions, respectively.

* * * * *